United States Patent [19]

Kusumgar et al.

[11] Patent Number: 4,828,755
[45] Date of Patent: May 9, 1989

[54] CONDUCTIVE POLYACETAL COMPOSITION EXHIBITING IMPROVED FLEXIBILITY AND TOUGHNESS

[75] Inventors: Rajal M. Kusumgar, Livingston; James L. Paul, Summit, both of N.J.

[73] Assignee: Hoechst Celanese Corporation, Somerville, N.J.

[21] Appl. No.: 152,307

[22] Filed: Feb. 4, 1988

[51] Int. Cl.[4] .............................................. H01B 1/06
[52] U.S. Cl. .................................... 252/511; 524/495; 524/496; 525/63; 525/66
[58] Field of Search ................. 252/511; 524/495, 496; 525/63, 66, 308, 302, 399

[56] References Cited

U.S. PATENT DOCUMENTS

| | | | |
|---|---|---|---|
| 3,442,850 | 5/1969 | O'Brien et al. | 260/37 |
| 4,391,741 | 7/1983 | Massamoto et al. | 252/511 |
| 4,555,357 | 11/1985 | Kausga et al. | 252/511 |
| 4,665,126 | 5/1987 | Kusumgar et al. | 526/66 |

FOREIGN PATENT DOCUMENTS

| | | |
|---|---|---|
| 120711 | 3/1983 | European Pat. Off. . |
| 167369 | 6/1984 | European Pat. Off. . |
| 1017244 | 1/1966 | United Kingdom . |

OTHER PUBLICATIONS

"Ketjenblack® EC", *Akzo Chemie America.*
"Ketjenblack EC-DJ-600", *Akzo Chemie America.*

*Primary Examiner*—Josephine Barr
*Attorney, Agent, or Firm*—Depaoli & O'Brien

[57] ABSTRACT

An electrically conductive polyacetal molding resin composition having improved flexibility and impact strength is provided by formulating an oxymethylene polymer, an electrically conductive carbon black having a surface area, BET $N_2$ of greater than 1,200 $m^2/g$ and a pore volume, DBP absorption of greater than 500 cc/100 g, and an elastomeric polyurethane.

10 Claims, No Drawings

CONDUCTIVE POLYACETAL COMPOSITION EXHIBITING IMPROVED FLEXIBILITY AND TOUGHNESS

FIELD OF THE INVENTION

The present invention relates to an electrically conductive polyacetal resin molding composition exhibiting improved flexibility and toughness.

BACKGROUND OF THE INVENTION

Heretofore, compounding polyacetal resin with a sufficient amount of electrically conductive carbon black has been practiced as a method for imparting electrical conductivity to the resin. Examples of electrically conductive polyacetal resin compositions are disclosed in U.S. Pat. Nos. 4,391,741 and 4,555,357. A useful and commercially available electrically conductive carbon black which has been used to form electrically conductive polyacetal resin has been KETJEN-BLACK EC (a product of Akzo Chemie). A typical conductive polyacetal formulation contains an oxymethylene copolymer having a melt index of 27.0 g/10 min. and 6 wt. % of the KETJENBLACK EC electrically conductive carbon black. While such formulation provides excellent conductivity, the addition of the carbon black significantly reduces the toughness and flexibility of the final molded product. In many applications where higher flexibility is required such as for snap fitting the molded polyacetal resin parts, breakage occurs because of poor elongation and low practical impact strength. Moreover, the need to use a 6 wt. % level of the electrically conductive carbon black to provide sufficient electrical conductivity to the polyacetal resin increases the melt viscosity of the polyacetal resin, degrading melt flow and thus, making it more difficult to form components from the resin by injection molding techniques.

One known method to improve the impact strength of polyacetal resins is by the incorporation of polyurethanes thereto. For example, commonly assigned U.S. Pat. No. 4,665,126 and European Patent Application No. 167,369, published Jan. 8, 1986 disclose oxymethylene polymer molding compositions having enhanced impact resistance by the incorporation of elastomeric polyurethanes. The patents are not directed to electrically conductive polyacetal resin compositions and, thus, do not address what effect the addition of polyurethane may have on electrical conductivity.

SUMMARY OF THE INVENTION

In accordance with the present invention, an electrically conductive polyacetal resin composition is prepared using a more effective electrically conductive carbon black having a higher surface area and lower contamination than prior used carbon black such that the amount of carbon black in the molding resin composition can be reduced from a level of 6% to about 4% by weight based on the composition. By reducing the carbon black to a level of 4 wt. %, electrically conductive polyacetal molding compositions can be formed utilizing an oxymethylene polymer having a melt index of 9.0 grams/10 min in place of the lower viscosity polyacetals used previously. The higher viscosity oxymethylene polymers useful in this invention have a higher impact strength and higher molecular weight than the lower molecular weight, high melt index polyacetal resins used in the prior electrically conductive compositions. Additionally, the electrically conductive polyacetal resin composition of the present invention is provided with improved flexibility and toughness by the addition of a polyurethane which does not degrade the electrical conductivity of the polyacetal composition. Moreover, the polyurethane since it is more temperature and shear sensitive than the oxymethylene polymer improves the flow of the electrically conductive polyacetal resin during injection molding and enhances the ability of the electrically conductive carbon black-filled resin to fill the mold cavity and, in general, improves processability over prior art compositions.

DETAILED DESCRIPTION OF THE INVENTION OXYMETHYLENE POLYMER

The oxymethylene polymer used in the molding composition of the present invention is well known in the art. The polymers are characterized as having recurring oxymethylene groups or units, i.e., $-CH_2O-$. The term oxymethylene polymer as used herein is intended to include any oxymethylene polymer having $-CH_2O-$ groups comprising at least about 50 percent of the recurring units, for example, homopolymer, copolymers, terpolymers and the like.

Typically, the homopolymers are prepared by the polymerization of anhydrous formaldehyde or by the polymerization of trioxane which is a cyclic trimer of formaldehyde. For example, high molecular weight polyoxymethylenes have been prepared by polymerizing trioxane in the presence of certain fluoride catalysts such as antimony fluoride and may also be prepared in high yields and at rapid reaction rates by the use of catalysts comprising boron fluoride coordinate complexes with organic compounds, as described in application Ser. No. 691,143, filed Oct. 21, 1957, by Hudgin and Berardinelli.

The homopolymers are usually stabilized against thermal degradation by end-capping or the incorporation therein of stabilizer compounds such as described in U.S. Pat. No. 3,133,896 to Dolce and Berardinelli.

Oxymethylene polymers that are particularly adapted for use in the molding compositions of the present invention are oxymethylene copolymers, which may be prepared as described in U.S. Pat. No. 3,027,352 of Walling et al by copolymerizing, for example, trioxane with any of various cyclic ethers having at least two adjacent carbon atoms, e.g., ethylene oxide, dioxolane, and the like.

Especially suitable oxymethylene copolymers which may be used in the molding compositions of the present invention usually possess a relatively high level of polymer crystallinity, i.e., about 70 to 80 percent. These preferred oxymethylene copolymers have repeating units which consist essentially of (a) $-OCH_2-$ groups interspersed with (b) groups represented by the general formula:

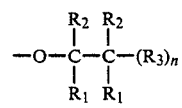

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals, and n is an integer from zero to three inclusive.

Each lower alkyl radical preferably has from one to two carbon atoms, inclusive. The —OCH$_2$— units of (a) constitute from about 85 to about 99.9 percent of the recurring units. The units of (b) may be incorporated into the copolymer during the step of copolymerization to produce the copolymer by the opening of the ring of a cyclic ether having adjacent carbon atoms, i.e., by the breaking of an oxygen-to-carbon linkage.

Copolymers of the desired structure may be prepared by polymerizing trioxane together with from about 0.1 to about 15 mole percent of a cyclic ether having at least two adjacent carbon atoms, preferably in the presence of a catalyst such as a Lewis acid (e.g, BF$_3$, PF$_5$, and the like) or other acids (e.g., HClO$_4$, 1% H$_2$SO$_4$, and the like). In general, the cyclic ethers employed in making the preferred oxymethylene copolymers are those represented by the general formula:

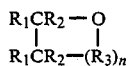

wherein each R$_1$ and R$_2$ is selected from the group consisting of hydrogen, lower alkyl and halogen-substituted lower alkyl radicals, and each R$_3$ is selected from the group consisting of methylene, oxymethylene, lower alkyl and haloalkyl-substituted methylene, and lower alkyl and haloalkyl-substituted oxymethylene radicals, and n is an integer from zero to three inclusive. Each lower alkyl radical preferably has from one to two carbon atoms, inclusive. The preferred cyclic ethers used in the preparation of the preferred oxymethylene copolymers are ethylene oxide and 1,3-dioxolane, which may be represented by the formula:

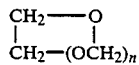

wherein n represents an integer from zero to two, inclusive. Other cyclic ethers that may be employed are 1,3-dioxane, trimethylene oxide, 1,2-propylene oxide, 1,2-butylene oxide, 1,3-butylene oxide and 2,2-di-(chloromethyl)-1,3-propylene oxide. The preferred catalyst used in preparing the desired oxymethylene copolymers is the aforementioned boron trifluoride as discussed in the previously identified Walling et al patent. Reference is made to this patent for further information concerning the polymerization conditions, amount of catalyst employed, and the like.

The oxymethylene copolymers produced from the preferred cyclic ethers have a structure composed substantially of oxymethylene and oxyethylene groups in a ratio of from about 6 to 1 to about 1000 to 1.

The oxymethylene copolymers that are preferably present in the molding compositions of the present invention are thermoplastic materials having a melting point of at least 150° C., and normally are millable or processable at a temperature of from about 180° C. to about 200° C. They have a number average molecular weight of at least 10,000. The preferred oxymethylene copolymers have an inherent viscosity of at least 1.0 (measured at 60° C. in a 0.1 weight percent solution in p-chlorophenol containing 2 weight percent of alphapinene).

The oxymethylene copolymer component of the molding composition of this invention preferably is an oxymethylene copolymer that has been preliminarily stabilized to a substantial degree. Such stabilizing technique may take the form of stabilization by degradation of the molecular ends of the polymer chain to a point where a relatively stable carbon-to-carbon linkage exists at each end. For example, such degradation may be effected by hydrolysis as disclosed in U.S. Pat. No. 3,219,623 to Berardinelli.

If desired, the oxymethylene copolymer may be end-capped by techniques known to those skilled in the art. A preferred end-capping technique is accomplished by acetylation with acetic anhydride in the presence of sodium acetate catalyst. A preferred oxymethylene copolymer is commercially available from Hoechst Celanese Corporation under the designation CELCON ® acetal copolymer. Preferred are acetal copolymers having a melt index of from about 5.0 to 15.0 g/10 min. Especially preferred is CELCON ® M90 which has a melt index of about 9.0 g/10 min. when tested in accordance with ASTM D1238-82.

Oxymethylene terpolymers may also be used and are prepared, for example, by reacting trioxane and a cyclic ether and/or cyclic acetal such as in the preparation of the oxymethylene copolymer, with a third monomer which is a bifunctional compound such as a diglycide of the formula:

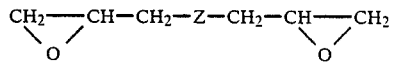

wherein Z represents a carbon-to-carbon bond, an oxygen atom, an oxy-alkoxy of 1 to 8 carbon atoms, preferably 2 to 4 carbon atoms, and which may be an oxycycloalkoxy of 4 to 8 carbon atoms, or an oxy-poly(lower alkoxy), preferably of 2 to 4 recurring groups each with 1 to 2 carbon atoms, for example, ethylene diglycide, diglycidyl ether and diethers of 2 mols of glycide and 1 mol of formaldehyde, dioxane or trioxane, or diethers of 2 mols of glycide and 1 mol of an aliphatic diol with 2 to 8 carbon atoms, advantageously 2 to 4 carbon atoms, or a cycloaliphatic diol with 4 to 8 carbon atoms.

Examples of suitable bifunctional compounds include the diglycidyl ethers of ethylene glycol, 1,4-butanediol, 1,3-butanediol, cyclobutane-1,3-diol, 1,2-propane-diol, cyclohexane-1,4-diol and 2-dimethyl-4-dimethyl-cyclobutane-1,3-diol, with butanediol diglycidyl ethers being most preferred.

Generally, in preparing the terpolymer of trioxane, cyclic ether and/or cyclic acetal and at least one bifunctional diglycide compound, a ratio of from 99.89 to 89.0 weight percent trioxane, 0.1 to 10 weight percent of the cyclic ether and/or cyclic acetal, and 0.01 to 1 weight percent of the bifunctional compound is preferred, with the percentage figures being based on the total weight of monomers used in forming the terpolymer. The terpolymers thus obtained are characterized as being essentially white and having a particularly good extrudability.

The polymerization of the terpolymer may be carried out according to known methods, that is in substance, solution or suspension, while using the above-mentioned quantitative proportions of the termonomers.

A preferred oxymethylene terpolymer is commercially available from Hoechst Celanese Corporation under the designation U10, and is a butanediol diglycidyl ether/ethylene oxide/trioxane terpolymer containing about 0.05 weight percent, 2.0 weight percent, and 97.95 weight percent of each component, respectively.

ELECTRICALLY CONDUCTIVE CARBON BLACK

The electrically conductive carbon black used in the present invention is an improved carbon black over the carbon black which has been used in the prior art. The carbon black used in the present invention has a surface area BET($N_2$) of at least 1,200 $m^2/g$ and a pore volume (DBP absorption) of greater than 500 cc/100 g. A particularly useful carbon black is available commercially under the tradename KETJENBLACK EC-DJ-600, available from Akzo Chemie. Table 1 below sets forth the differences between the improved carbon black useful in this invention and the normal grade KETJENBLACK EC used in the prior art.

TABLE 1

| | | KETJEN BLACK EC | |
|---|---|---|---|
| | | DJ-600 | normal grade |
| iodine adsorption | mg/g | 1000 | 900 |
| surface area BET $N_2$ | $m^2/g$ | 1250 | 950 |
| pore volume (DBP-absorption) | $cm^3/100$ g | 510 | 350 |
| ash content | % | 0.5 | 0.7 |
| grit content | % | 0.003 | 0.02 |
| volatiles | % | 0.7 | 1.0 |
| moisture | % | 0.5 | 1.0 |
| apparent bulk density | $kg/m^3$ | 125 | 130 |
| pH | | 7 | 8 |

ELASTOMERIC POLYURETHANE

Elastomeric polyurethanes which are suitable for improving the impact strength of the oxymethylene polymer composition are those which have been prepared from polyester polyols, polyether polyols such as polyethylene-glycol ethers, polypropylene-glycol ethers, polytetramethylene-glycol ethers or polyacetals having free hydroxyl end groups and polyisocyanates, in particular diisocyanates, using chain-extending agents such as low molecular weight polyols, preferably glycols. Examples of useful thermoplastic polyurethanes can be found in previously-mentioned U.S. Pat. No. 4,665,126 and published European Patent Application No. 167,369, both of which are herein incorporated by reference.

The polymeric polyols and polyol extenders which can be used are those conventionally employed in the art for the preparation of such elastomers. The polymeric polyols are preferably polymeric diols which advantageously have molecular weights in the range of 400 to 4000 and preferably within the range of about 500 to about 3000. Illustrative of polymeric diols are polyester diols and polyether diols and mixtures thereof having molecular weights within the above range. The polyester diols include the essentially linear polymeric diols which are obtained by esterification of an aliphatic or aromatic dibasic acid or anhydride with a glycol. Preferably the glycol is employed in excess of the stoichiometric proportion with respect to the acid or anhydride in order to ensure that the polyesters are hydroxyl-terminated. Representative dicarboxylic acids (or their anhydrides) employed in the preparation of the polyester diols are adipic, succinic, pimelic, suberic, azelaic, sebacic, terephthalic, phthalic, and the like acids or their anhydrides or mixtures of two or more of said acids or anhydrides. Adipic acid is the preferred acid. Representative glycols employed in the preparation of the polyester diols are the straight chain aliphatic glycols containing from 2 to 10 carbon atoms, inclusive, such as ethylene glycol, propane-1,3-diol, butane-1,4-diol, 2-butene-1,4-diol, hexane-1,6-diol, octane-1,8-diol, decane-1,10-diol, and the like, or mixtures of two or more such glycols.

In addition to the above type of polyester diols, there can also be used the polycaprolactone diols which are prepared by polymerizing the appropriate caprolactone with the appropriate difunctional initiator, such as an aliphatic glycol as exemplified above or an alkanolamine such as ethanolamine, propanolamine, butanolamine, and the like. Such procedures and products are well-known in the art; see, for example, U.S. Pat. No. 2,914,556. A particularly preferred polyester diol is that obtained by initiating the polymerization of $\epsilon$-caprolactone with 1,4-butanediol.

The polyether polyols employed in the preparation of the polyurethane elastomers of the invention include the polyether glycols having molecular weights in the above defined range and prepared by reacting ethylene oxide, propylene oxide, butylene oxide, or mixtures thereof with water or with diols such as ethylene glycol, 1,2-propylene glycol, 1,3-propanediol 1,4-butanediol, 2,3-butanediol, 1,5-pentanediol, 1,2-hexanediol, diethanolamine, resorcinol, catechol, bis(p-hydroxyphenyl) methane, diethylene glycol, dipropylene glycol, and the like.

The extenders which are employed in preparing the polyurethane elastomers of the invention can be any of the diol extenders commonly employed in the art. Illustrative of diol extenders are aliphatic diols, advantageously containing from 2 to 6 carbon atoms, inclusive, such as ethylene glycol, 1,3-propylene glycol, 1,2-propylene glycol, 1,4-butanediol, 1,2-hexanediol, neopentyl glycol, and the like; and dihydroxyalkylated aromatic compounds such as the bis(2-hydroxyethyl)ethers of hydroquinone and resorcinol; p-xylene-a,a'-diol; the bis(2-hydroxyethyl)ether of p-xylene-a,a'-diol: m-xylene-a,a'-diol and the bis(2-hydroxyethyl)ether thereof.

The organic diisocyanate employed in the process of the invention can be any of those commonly employed in the preparation of polyurethane elastomers. Illustrative of said diisocyanates are 2,4-tolylenediisocyanate, 2,6-tolylene diisocyanate, 4,4'-methylenebis(phenyl isocyanate), 3,3'-dimethyl-4,4'-diisocyanatodiphenyl, 3,3'-dimethoxy-4,4'-diisocyanatodiphenyl, 3,3'-dichloro-4,4'-diisocyanatodiphenyl, $\beta,\beta'$-diisocyanato-1,4-diethylbenzene, 1,5-naphthalene diisocyanate, 1,4-phenylene diisocyanate, and the like, including mixtures of two or more of the above diisocyanates. The preferred diisocyanate is 4,4'-methylenebix(phenyl isocyanate).

Regardless of the particular polyurethane reaction method which is chosen, the hydroxyl components (i.e., the polyester or polyether polyol and the polyol extender) and the diisocyanate are used such that the overall ratio of isocyanate equivalents or groups to total hydroxyl equivalents or groups is within the range of about 1:1 to about 1.08:1.0, and preferably is within the range of about 1.02:1.0 to about 1.07:1.0. The most preferred ratio of isocyanate (NCO) groups to total hydroxyl (OH) groups is within the range of from about 1.03:1.0 to about 1.06:1.0.

The term equivalent(s) as used with respect to the polyurethane preparation in the present specification and claims is based on the hydroxyl and isocyanate groups of the reactants.

The polyurethanes which are useful in the present invention can be prepared by processes which are conventional in the art for the synthesis of thermoplastic polyurethanes. Illustrative of such processes are those described in U.S. Pat. Nos. 3,493,364; 4,169,196; 4,202,957; and 3,642,964. Such processes include the one-shot procedure in which all of the reactants are brought together simultaneously, and the prepolymer procedure in which the isocyanate is reacted with the polyester or polyether glycol in a first-step and the isocyanate-terminated prepolymer so produced is subsequently reacted with the diol extender. The one-shot process also includes the process in which the diisocyanate has been converted to a quasiprepolymer by reaction with a minor amount (i.e., less than about 10% on an equivalent basis) of the glycol prior to carrying out the polyurethane-forming reaction.

MOLDING COMPOSITION

It is within the ambit of the present invention to use oxymethylene polymers that include, if desired, plasticizers, formaldehyde scavengers, mold lubricants, antioxidants, fillers, colorants, reinforcing agents, light stabilizers, pigments, other stabilizers, and the like, so long as such additives do not materially affect the desired properties including enhancement of impact strength and electrical conductivity of the resulting molding composition and the articles molded therefrom.

Suitable formaldehyde scavengers include cyanoguanidine, melamines, polyamides, amine-substituted triazines, amidines, ureas, hydroxyl salts of calcium, magnesium, and the like, salts of carboxylic acids, and metal oxides and hydroxides. Cyanoguanidine (CNG) is the preferred formaldehyde scavenger. Suitable mold lubricants include alkylene bisstearamide, long-chain amides, waxes, oils, and polyether glycides. The preferred mold lubricant is commercially available from Glyco Chemical, Inc. under the designation Acrawax C and is alkylene bisstearamide. The preferred antioxidants are hindered bisphenols. Especially preferred is 1,6-hexamethylene bis-(3,5-di-t-butyl-4-hydroxyhydrocinnamate), commercially available from Ciba-Geigy Corp. under the designation Irganox 259.

The electrically conductive polyacetal resin compositions of the present invention will comprise from about 75 to 85% by weight of the polyacetal, 5 to 20%, preferably 10% by weight of the elastomeric polyurethane, 2 to 5%, preferably 4% by weight of the electroconductive carbon black, with the remainder comprising the known stabilizers and processing aids.

The molding compositions may suitably be prepared by any conventional procedure that will result in an intimate blend or mixture of the components. Preferably, dry or melt blending procedures and equipment are used. For example, the polyurethane (in the form of pellets, chips, or granules) can be dry mixed with the oxymethylene polymer (in the form of pellets, chips, granules or powder) typically at room temperatures, and the resulting mixture melt blended in any conventional type extrusion equipment, which is heated to a temperature of from about 180° C., to about 230° C., and preferably from about 185° C. to about 205° C.

Preferably, the polyurethane elastomer and oxymethylene polymer are dried (either alone or together) before being subjected to the intimate blending procedure. The drying can be done in desiccated air having a dew point of about −30° C. to −40° C. or lower, at a temperature of from about 70° C. to about 110° C., and preferably above 80° C. The drying can also be accomplished in a vacuum oven, for example, at a temperature above about 90° C. The drying time will depend primarily on the moisture content, drying temperature, and particular equipment employed, but typically is from about 2 to about 6 hours or more. If the drying is conducted for longer periods of time, such as overnight, the drying temperature should preferably be about 70° C. to about 85° C. In general, any conventional drying procedure can be used to reduce the moisture content to below about 0.1 weight percent, based on the total weight of the polyurethane and oxymethylene polymer, preferably below about 0.05 weight percent, and most preferably below about 0.01 weight percent or lower. As is well known to those skilled in the art, water will react with polyurethanes upon processing the polyurethanes at elevated temperatures.

The oxymethylene molding composition resulting from the intimate blending procedure is then comminuted mechanically, for example by chopping, pelletizing or grinding, into granules, pellets, chips, flakes or powders, and processed in the thermoplastic state, for example by injection molding or extrusion molding, into shaped articles, for example, bars, rods, plates, sheets, films, ribbons, tubes and the like.

EXAMPLES

Samples of a comparative prior art electrically conductive polyacetal resin composition (Sample A) and an electrically conductive polyacetal resin within the scope of the present invention composition (Sample B) were formulated. The sample formulations are shown in Table 2. The samples were formulated on a 30 mm twin scew ZSK extruder at a temperature of from 370°–400° F. The compounded samples were molded into test samples on a 5 oz. Reed injection molding machine at a mold temperature of 200° F. The physical and electrical properties of the two samples are shown in Table 3.

TABLE 2

| SAMPLE A COMPARATIVE FORMULATION | | SAMPLE B INVENTION FORMULATION | |
|---|---|---|---|
| | % | | % |
| Polyacetal[1] | 86.7 | Polyacetal[2] | 79.4 |
| KETJENBLACK EC | 6.0 | Polyurethane[3] | 10.0 |
| Polyethylene Wax | 1.8 | KETJENBLACK EC-DJ-600 | 4.0 |
| CNG | 0.6 | Polyethylene Wax | 1.8 |
| Melamine | 0.3 | Elvamide 8063[4] | 1.0 |
| Lauric diethanol amide | 0.8 | Lauric diethanol amide | 0.8 |
| Carbowax 3350 (PEG) | 3.0 | Carbowax 3350 (PEG) | 3.0 |
| Naugard 445 (Processing aid) | 0.8 | | |

[1]Trioxane-ethylene oxide copolymer containing about 98 wt. % of recurring —OCH$_2$— groups and about 2 wt. % ethylene oxide groups, Celcon M270 TM, melt index = 27.0 g/10 min.
[2]Trioxane-ethylene oxide copolymer containing about 98 wt. % of recurring —OCH$_2$— groups and about 2 wt. % ethylene oxide groups, Celcon M90-04 TM, melt index = 9.0 g/10 min.
[3]Polyester polyurethane, Elasotolane S80A, Upjohn
[4]Superpolyamide stabilizer

TABLE 3

| PROPERTIES OF ELECTRICALLY CONDUCTIVE POLYACETAL | | | |
|---|---|---|---|
| Physical Properties | Units | Sample A | Sample B |
| Tensile strength | psi | 6,000–6,500 | 5,300 |
| Tensile elongation | % | 2–3 | 20 |
| Flexural strength | psi | 11,500 | 7,600 |

TABLE 3-continued

PROPERTIES OF ELECTRICALLY
CONDUCTIVE POLYACETAL

| Physical Properties | Units | Sample A | Sample B |
|---|---|---|---|
| Flexural modulus | psi | 380,000 | 250,000 |
| Notches izod | ft. lbs/in. notch | 0.6 | 1.0 |
| Practical impact | in. lbs | 2–4 | 25 |
| Electrical conductivity | | | |
| Volume resistivity | ohms · cm | <150 | <150 |
| Static decay time | second | 0.01 | 0.01 |

As can be seen from Table 3, the elongation of Sample B as formulated in accordance with the present invention is about 10 times greater than the elongation of the prior electrically conductive polyacetal. Further, both notched izod and practical impact strengths are vastly improved utilizing the electrically conductive polyacetal resin of the present invention. Importantly, the electrical properties are maintained utilizing the polyacetal resin of the present invention compared to the higher loaded prior art formulation.

What is claimed is:

1. An electrically conductive polyacetal resin composition comprising; 75 to 85% by weight of an oxymethylene polymer containing at least 50% —OCH$_2$— units, 3 to 5% by weight of an electrically conductive carbon black having a surface area, BET(N$_2$) of at least 1,200 square meters per gram and a pore volume, DBP absorption of at least 500 cubic centimeters per 100 grams, and 5 to 20% by weight of an elastomeric polyurethane to provide improved flexibility and impact strength to the polyacetal composition.

2. The polyacetal resin composition of claim 1 wherein said carbon black is present in amounts of about 4% by weight.

3. The polyacetal resin composition of claim 1 wherein said oxymethylene polymer has a melt index of 9.0 g/10 min.

4. The polyacetal resin composition of claim 1 wherein said oxymethylene polymer is a copolymer containing a minor proportion of ethylene oxide units.

5. An electrically conductive polyacetal resin composition comprising; 75 to 85% by weight of an oxymethylene polymer containing at least 50% —OCH$_2$— units and having a melt index of from about 5.0 to 15.0 g/10 min., 5 to 20% by weight of an elastomeric polyurethane to provide improved flexibility and impact to the polyacetal composition and 3 to 5% weight of an electrically conductive carbon black having a surface area, BET(N$_2$) of at least 1,200 square meters per gram and a pore volume, DBP absorption of at least 500 cubic centimeters per 100 grams.

6. The polyacetal resin composition of claim 5 wherein said carbon black is present in amounts of about 4% by weight.

7. An electrically conductive polyacetal resin composition comprising; 75 to 85% by weight of an oxymethylene polymer containing at least 50% —OCH$_2$— units and having a melt index of about 9.0 g/10 min., 4% by weight of an electrically conductive carbon black having a surface area, BET(N$_2$) of at least 1,200 square meters per gram and a pore volume, DBP absorption of at least 500 cubic centimeters per 100 grams, and about 10% by weight of an elastomeric polyurethane to provide improved flexibility and impact to the polyacetal composition.

8. The electrically conductive polyacetal resin of claim 1 wherein said carbon black has a surface area, BET(N$_2$) of about 1,250 square meters per gram and a pore volume, DBP absorption of about 510 cubic centimeters per 100 grams.

9. The electrically conductive polyacetal resin of claim 5 wherein said carbon black has a surface area, BET(N$_2$) of about 1,250 square meters per gram and a pore volume, DBP absorption of about 510 cubic centimeters per 100 grams.

10. The electrically conductive polyacetal resin of claim 7 wherein said carbon black has a surface area, BET(N$_2$) of about 1,250 square meters per gram and a pore volume, DBP absorption of about 510 cubic centimeters per 100 grams.

* * * * *